(12) United States Patent
Chuang et al.

(10) Patent No.: US 8,780,040 B2
(45) Date of Patent: Jul. 15, 2014

(54) HANDWRITING INPUT DEVICE

(75) Inventors: Ping-Yang Chuang, Taipei Hsien (TW);
Ying-Chuan Yu, Taipei Hsien (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 482 days.

(21) Appl. No.: 12/949,784

(22) Filed: Nov. 19, 2010

(65) Prior Publication Data

US 2011/0304544 A1    Dec. 15, 2011

(30) Foreign Application Priority Data

Jun. 10, 2010 (TW) .............................. 99118853 A

(51) Int. Cl.
*G06F 3/033* (2013.01)

(52) U.S. Cl.
USPC ........ 345/156; 345/173; 345/179; 178/18.01; 178/18.02; 178/18.03; 178/18.04; 178/18.05; 178/18.06; 178/18.07; 178/18.09; 178/18.11; 178/19.01; 178/19.02; 178/19.03; 178/19.04; 178/19.05; 178/19.06; 178/19.07

(58) Field of Classification Search
USPC ............ 345/156, 173, 179; 178/18.01–18.09, 178/18.11, 19.01–19.07
See application file for complete search history.

(56) References Cited

U.S. PATENT DOCUMENTS

| | | | |
|---|---|---|---|
| 2003/0112220 A1* | 6/2003 | Yang et al. | 345/156 |
| 2006/0250380 A1* | 11/2006 | Oliver | 345/179 |
| 2008/0055280 A1* | 3/2008 | Bi et al. | 345/179 |
| 2008/0122790 A1* | 5/2008 | Cheng et al. | 345/164 |
| 2008/0245583 A1* | 10/2008 | Lapstun et al. | 178/19.05 |

FOREIGN PATENT DOCUMENTS

| | | |
|---|---|---|
| CN | 1818839 A | 8/2006 |
| CN | 101154136 A | 4/2008 |
| CN | 101581981 A | 11/2009 |
| TW | 561394 | 11/2003 |
| TW | 200839577 A | 10/2008 |

* cited by examiner

*Primary Examiner* — Alexander S Beck
*Assistant Examiner* — Jeffrey Steinberg
(74) *Attorney, Agent, or Firm* — Novak Druce Connolly Bove + Quigg LLP

(57) ABSTRACT

A handwriting input device includes a housing and a nib selectively exposed from a bottom side of the housing or hidden in the housing. The device further includes a pressure sensor, a motion sensor, and a microcontroller. The pressure sensor generates pressure signals when the nib is depressed. The motion sensor senses movement of the device. The microcontroller records the sensed movement upon receiving the pressure signals, and processes the recorded movement to obtain track signals of handwritten information when the duration of not receiving the pressure signals exceeds a predetermined time interval. The track signals of handwritten information are then transmitted to an external electronic device communicating with the device to become handwriting shown on a display of the external electronic device.

12 Claims, 3 Drawing Sheets

HANDWRITING INPUT DEVICE

BACKGROUND

1. Technical Field

The present disclosure relates to handwriting input devices and, particularly, to a handwriting input device capable of tracking and identifying its movement, and inputting the identified movement to an external electronic device to become handwriting.

2. Description of Related Art

Conventional handwriting input devices include a magnetic handwriting digital panel and a touch pen, or a digital panel with an LCD and a touch pen, and the touch pen needs to work in tandem with the digital panel. Hence, not only the cost increases, but also it is inconvenient for users to carry both the panel and the touch pen around together.

BRIEF DESCRIPTION OF THE DRAWINGS

The components of the drawings are not necessarily drawn to scale, the emphasis instead being placed upon clearly illustrating the principles of a handwriting input device. Moreover, in the drawings, like reference numerals designate corresponding parts throughout several views.

DETAILED DESCRIPTION

Figure 1:
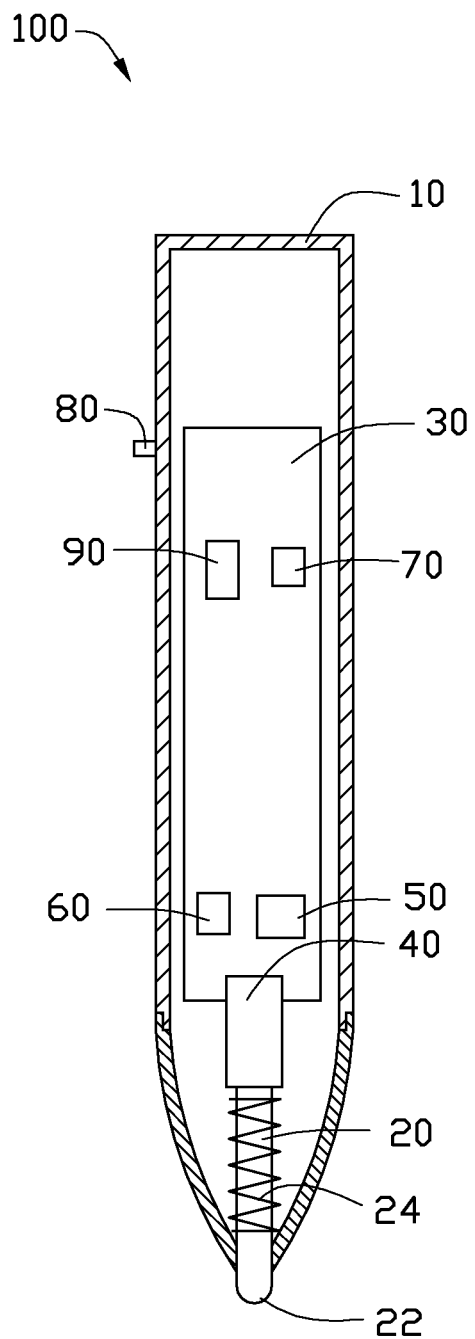
FIG. 1 is a cross-sectional, schematic view of a handwriting input device in accordance with an exemplary embodiment, showing an interior structure of the handwriting input device.

Referring to FIG. 1, an embodiment of a handwriting input device 100 is illustrated. The device 100 includes a housing 10 and a head 20. The housing 10 is substantially pen-shaped. The head 20 is received in the housing 10 and includes a nib 22. The nib 22 is installed so it can always be pushed by a spring 24, enabling it to move inward to the housing 10 against the elastic force of the spring 24 when it is depressed against a contact surface. It can move outward from the housing 10 by virtue of the elastic force of the spring 24 when the depression is released, so the nib 22 returns to its original state. The nib 22 may be a pen tip, a pencil or any other writing instruments.

The device 100 further includes a circuit board 30 housed in the housing 10, a pressure sensor 40, a motion sensor 50, a communication module 60, a microcontroller 70, and a switch 80, all of which are electrically connected to the circuit board 30. The device 100 communicates with external electronic devices through the communication module 60. The communication unit 60 may include any one or more of a BLUETOOTH module, an infrared module, a USB interface, and a WIFI module, for example. The switch 80 is disposed on the housing 10 to switch the device 100 between a digital pen mode and a mouse mode. Therefore, the device 100 can be used for different functions such as a digital pen function or a mouse function according to user's need.

The pressure sensor 40 generates pressure signals when the nib 22 is depressed by any contact surface, for example, a desk.

The motion sensor 50 senses movement of the device 100. The motion sensor 50 may include an acceleration sensor. The acceleration sensor may be a two-axis or a three-axis acceleration sensor. The motion sensor 50 may further include a gyroscope.

The microcontroller 70 records the sensed movement within the period of receiving the pressure signals when the device 100 is in the digital pen mode, and further processes the recorded movement to obtain track signals of handwritten information when the duration of not receiving the pressure signals exceeds a predetermined time interval. The track signals are transmitted to an external electronic device communicating with the device 100 through the communication module 60 to become handwriting shown on a display of the external electronic device. In this embodiment, when the nib 22 is depressed, the microcontroller 70 determines that the device 100 is being operated to write something, and begins to record the movement sensed by the motion sensor 50. When the microcontroller 70 does not receive the pressure signals from the pressure sensor 40 within the predetermined time interval, the microcontroller 70 determines that a writing action is completed, and processes the recorded movement to obtain track signals of handwritten information. When writing something, the nib 20 may be depressed continuously, thus the pressure sensor 40 may generate continuous pressure signals. When the duration of not receiving continuous pressure signals exceeds the predetermined time interval, the microcontroller 70 determines that the writing action is completed. With such configuration, the device 100 does not need to be used on a digital panel. Hence, not only does cost decrease, but also it is more convenient for a user to carry around.

The microcontroller 70 generates control signals for controlling movement of a cursor displayed on a computer communicating with the device 100 according to movement sensed by the motion sensor 50 when the device 100 is in the mouse mode, and transmits the control signals to the computer through the communication unit 60.

The device 100 further includes a power providing module 90 to provide power to the device 100. The power providing module 90 may include a battery compartment and a battery therein.

Figure 2:
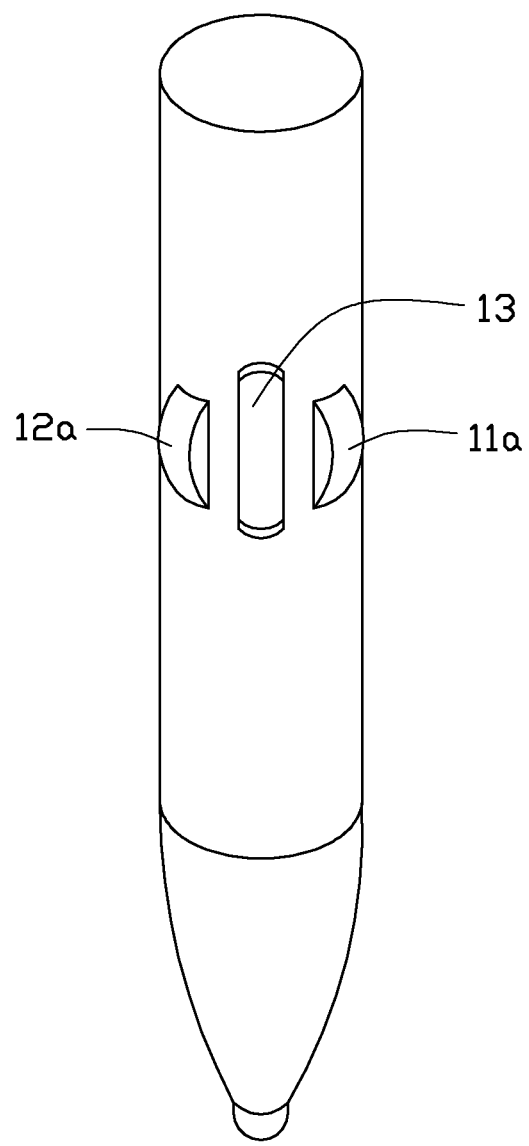
FIG. 2 is an isometric view illustrating the handwriting input device of FIG. 1 employed as a mouse in accordance with a first embodiment.

FIG. 2 shows that the device 100 is employed as a mouse in a first embodiment. The device 100 includes a first button 11a, a second button 12a, and a roller 13, all of which are electrically connected to the circuit board 30 and are exposed outside the housing 10 for operation. The function of the first button 11a is similar to the function of a left button of a standard mouse, the function of the second button 12a is similar to the function of a right button of a standard mouse, and the function of the roller 13 is similar to the function of a roller of a standard mouse.

Figure 3:
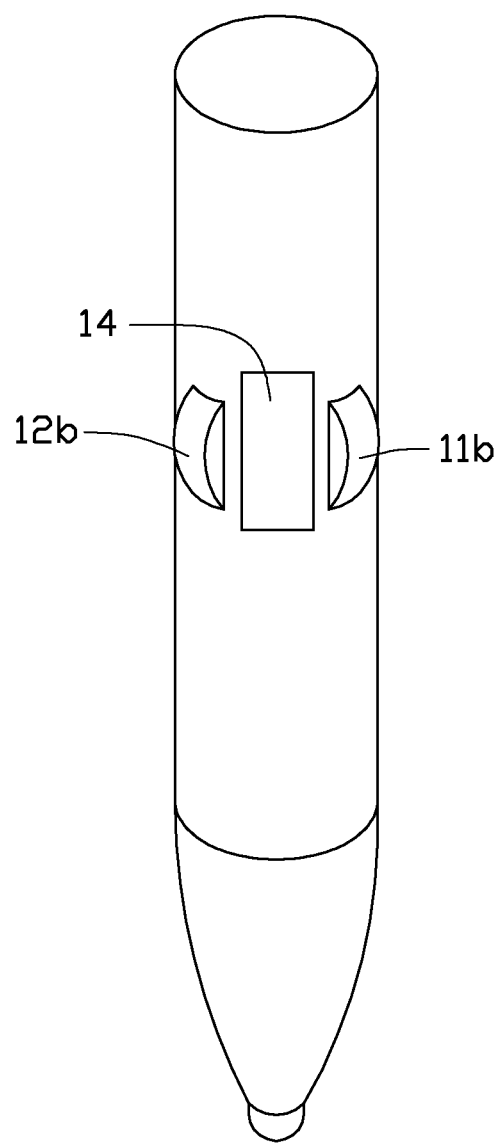
FIG. 3 is another isometric view illustrating the handwriting input device of FIG. 1 employed as a mouse in accordance with a second embodiment.

FIG. 3 shows that the device 100 is employed as a mouse in a second embodiment. The device 100 includes a first button 11b, a second button 12b, and a touch pad 14, all of which are electrically connected to the circuit board 30 and are exposed outside the housing 10 for operation. The function of the first button 11b is similar to the function of a left button of a standard mouse, the function of the second button 12b is similar to the function of a right button of a standard mouse, and the function of the touch pad 14 is similar to the function of a roller of a standard mouse.

Although the present disclosure has been specifically described on the basis of the exemplary embodiment thereof, the disclosure is not to be construed as being limited thereto.

Various changes or modifications may be made to the embodiment without departing from the scope and spirit of the disclosure.

What is claimed is:

1. A handwriting input device comprising:
 a housing;
 a head received in the housing and comprising a nib, the nib capable of being exposed from a bottom side of the housing or hidden in the housing;
 a circuit board housed in the housing;
 a pressure sensor electrically connected to the circuit board and to generate pressure signals when the nib is depressed;
 a motion sensor electrically connected to the circuit board and to sense movement of the handwriting input device;
 a microcontroller electrically connected to the circuit board and to record the sensed movement within a period of receiving the pressure signals, and further to process the recorded movement to obtain track signals of handwritten information when the duration of not receiving the pressure signals exceeds a predetermined time interval; and
 a communication module to transmit the track signals of the handwritten information to an external electronic device communicating with the handwriting input device.

2. The handwriting input device as described in claim 1, further comprising a switch electrically connected to the circuit board and to switch the handwriting input device between a digital pen mode and a mouse mode.

3. The handwriting input device as described in claim 2, wherein the microcontroller is to record the sensed movement within the period of receiving the pressure signals when the handwriting input device is in the pen mode, and the microcontroller is to generate control signals to control movement of a displayed cursor according to the movement sensed by the motion sensor when the handwriting input device is in the mouse mode.

4. The handwriting input device as described in claim 1, wherein the motion sensor comprises an acceleration sensor.

5. The handwriting input device as described in claim 4, wherein the acceleration sensor is a two-axis acceleration sensor.

6. The handwriting input device as described in claim 4, wherein the acceleration sensor is a three-axis acceleration sensor.

7. The handwriting input device as described in claim 4, wherein the motion sensor further comprises a gyroscope.

8. The handwriting input device as described in claim 1, wherein the communication module comprises at least one module selected from the group consisting of a BLUETOOTH module, an infrared module, a USB interface, and a WIFI module.

9. The handwriting input device as described in claim 1, further comprising a power providing module to provide power to the handwriting input device.

10. The handwriting input device as described in claim 2, further comprising a first button and a second button electrically connected to the circuit board and exposed outside the housing for operation in the mouse mode.

11. The handwriting input device as described in claim 10, further comprising a roller electrically connected to the circuit board and exposed outside the housing for operation in the mouse mode.

12. The handwriting input device as described in claim 10, further comprising a touch pad electrically connected to the circuit board and exposed outside the housing for operation in the mouse mode.

* * * * *